United States Patent [19]

Tanaka

[11] Patent Number: 4,982,821

[45] Date of Patent: Jan. 8, 1991

[54] FRICTION DEVICE OF LOCKUP CLUTCH

[75] Inventor: Teruhiko Tanaka, Osaka, Japan

[73] Assignee: Kabushiki Kaisha Daikin Seisakusho, Osaka, Japan

[21] Appl. No.: 393,910

[22] PCT Filed: Nov. 28, 1988

[86] PCT No.: PCT/JP88/01202

§ 371 Date: Aug. 2, 1989

§ 102(e) Date: Aug. 2, 1989

[87] PCT Pub. No.: WO89/05415

PCT Pub. Date: Jun. 15, 1989

[30] Foreign Application Priority Data

Dec. 7, 1987 [JP] Japan .................. 62-310355
Dec. 7, 1987 [JP] Japan .................. 62-310356

[51] Int. Cl.$^5$ ............................................. F16D 33/18
[52] U.S. Cl. .................. 192/3.29; 192/106.2
[58] Field of Search .......... 192/3.28, 3.29, 3.3, 192/30 V, 106.1, 106.2

[56] References Cited

U.S. PATENT DOCUMENTS

| 4,091,899 | 5/1978 | Stevenson | 192/3.3 |
| 4,167,993 | 9/1979 | Vokovich et al. | 192/3.3 |
| 4,177,885 | 12/1979 | Ross | 192/3.3 |
| 4,240,532 | 12/1980 | Blomquist | 192/3.28 |
| 4,406,355 | 9/1983 | Bionaz | 192/3.3 |
| 4,437,551 | 3/1984 | Gimmler et al. | 192/3.28 |
| 4,576,260 | 3/1986 | Koshimo | 192/3.29 |
| 4,580,668 | 4/1986 | Pickard et al. | 192/3.29 |

FOREIGN PATENT DOCUMENTS

| 55-54758 | 4/1980 | Japan . |
| 57-54770 | 4/1982 | Japan . |
| 59-83833 | 5/1984 | Japan . |

Primary Examiner—Rodney H. Bonck
Assistant Examiner—Nicholas Whitelaw
Attorney, Agent, or Firm—Armstrong, Nikaido, Marmelstein, Kubovcik & Murray

[57] ABSTRACT

Disclosed is a friction device of a lockup clutch which comprises an annular and plate-shaped piston linking with pressure to the input portion of a torque converter, an annular driven plate linking to the turbine of the torque converter, and damper springs for coupling the piston and driven plate in the circumferential direction, in which a friction mechanism is disposed between the internal circumferential portion of the piston and the turbine hub, and this friction mechanism is provided with a first friction member not rotatable relative to the turbine hub and a second friction member not rotatable relative to the piston, and these two friction members are pressed to each other so as to produce friction in the friction members by the relative rotation of piston and turbine hub.

9 Claims, 2 Drawing Sheets

FRICTION DEVICE OF LOCKUP CLUTCH

BACKGROUND OF THE INVENTION

1. Field of the Invention

The present invention relates to a lockup clutch to be incorporated into a torque converter of automobiles and the like, and more particularly to a friction device to be assembled in such lockup clutch.

2. Description of the Prior Art

Lockup clutches to which the invention is applied are disclosed, for example, in the U.S. Pat. No. 4,240,532, the Japanese Utility Model Publication No. 61-28126, and the Japanese Utility Model Application Nos. 61-170593 and 61-170594.

In such clutches, the piston as the input portion and the driven plate as the output portion are linked in the circumferential direction by means of plural damper springs (compressive coil springs), and the torque vibrations are absorbed by the expansion and contraction of these springs.

The torque vibration absorbing characteristics of clutches depend, generally, not only on characteristics of damper springs but also on friction characteristics of discs. That is, when the piston and driven plate of the lockup clutch deflect relatively, it is composed to cause a proper friction corresponding to such deflecting action, thereby building up a proper hysteresis torque on the deflection characteristics of the disc, so tha the torque vibrations may be effectively absorbed.

In the conventional lockup clutches, however, since there is no particular mechanism for generating the friction, the hysteresis torque cannot be set accurately to a desired value.

SUMMARY OF THE INVENTION

To solve the above problems, this invention presents a friction device of a lockup clutch comprising an annular and plate-shaped piston linking with pressure to the input portion of a torque converter, an annular driven plate linking to the turbine of the torque converter, and damper springs for coupling the piston and driven plate in the circumferential direction, in which a friction mechanism is disposed between the internal circumferential portion of the piston and the turbine hub, and this friction mechansim is provided with a first friction member not rotatable relative to the turbine hub and a second friction member not rotatable relative to the piston, and these two friction members are pressed to each other so as to produce friction in the friction members by the relative rotation piston and turbine hub.

In such constitution, in the clutch linked state, that is, while the piston is press-fitted to the input portion of the torque converter, the piston and driven plate deflect relatively along with the expansion and contraction of damper spring. In this deflecting action, the piston turns about the flange and annular member of the turbine hub, which builds up friction in the friction mechanism.

DESCRIPTION OF THE PREFERRED EMBODIMENTS

Figure 1:
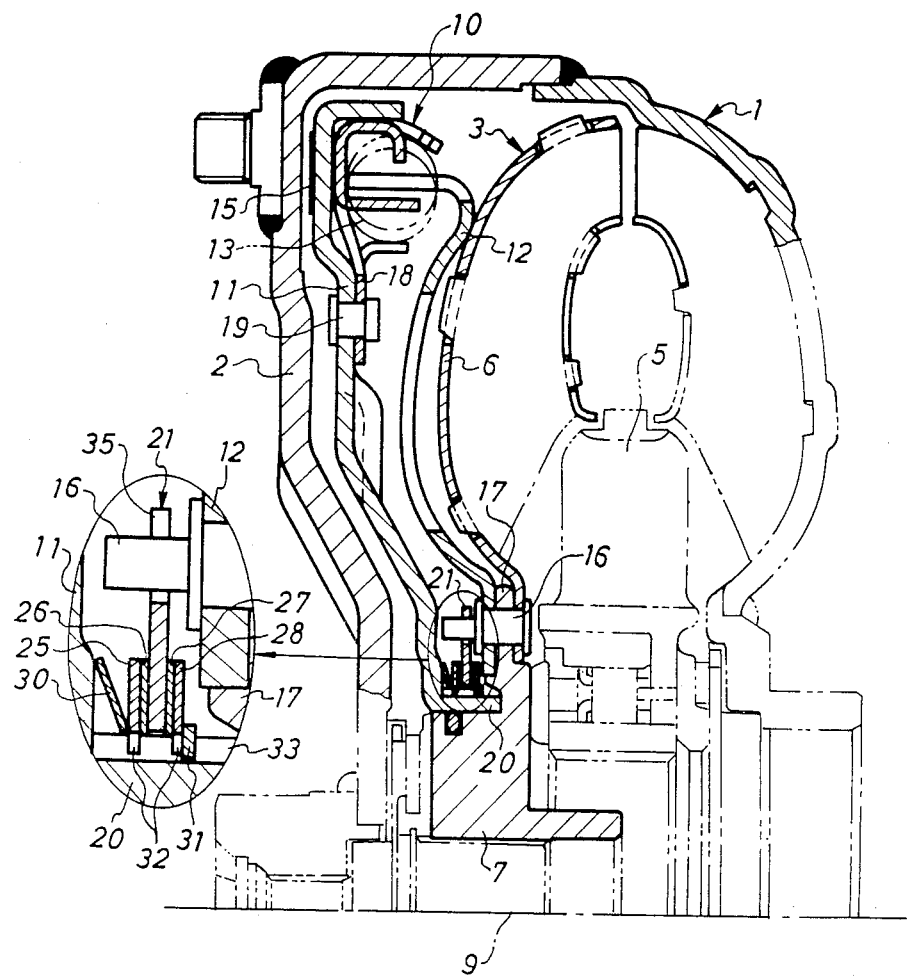
FIG. 1 is a partial sectional view of an embodiment of the invention.

In FIG. 1, an impeller 1 of a torque converter has the outer front end of its shell affixed to the outer front end of a front cover 2. The front cover 2 is coupled to the output portion of an engine which is not shown in the drawing, and composes an input portion of the torque converter. A turbine 3 is disposed between the impeller 1 and front cover 2, and a stator 5 is installed between the impeller 1 and the turbine 3. A shell 6 of the turbine 3 has its inner circumference linked to a hub 7. The hub 7 is coupled to an output shaft 9 (of which center line only is shown).

A lockup clutch 10 is installed between the front cover 2 and turbine 3. The lockup clutch 10 comprises approximately annular and plate-shaped piston 11 and driven plate 12, and plural springs 13 (of which only one is shown) disposed at an interval in the circumferential direction.

On the outer circumference of the piston 11, an annular friction lining 15 is applied. The lining 15 opposes the inside of the outer circumference in the axial direction, and as the piston 11 moves to the front cover 2 side by oil pressure, the lining 15 is pressed against the front cover 2, so that the piston 11 is linked to the front cover 2.

The driven plate 12 is disposed between the piston 11 and turbine 3, and its internal circumference is affixed to a flange 17 of the hub 7 together with the shell 6 by means of plural rivets 16 (only one of which is shown).

Each spring 13 has its one end engaged with the folding part of the outer circumference of the driven plate 12, while the other end is engaged with a plate-shaped member 18. The member 18 is affixed to the piston 11 by means of a rivet 19.

The structure of these components is known, and the details are omitted here.

Inside the piston 11, a tubular part 20 is integrally formed. This tubular part 20 is extending in the axial direction from the annular main body of the piston 11 toward the inside of the radial direction of the driven plate 12, and is slidably fitted to the outer circumference of the hub 7, same as in the prior art.

In this embodiment of the invention, furthermore, an annular plate 21 (a first friction plate) is fitted to the outer circumference of the tubular part 20 with its inner circumference free to rotate and move in the axial direction. At both sides of the annular plate 21, plural annular friction members (second friction plates), that is, friction plate 25, friction washers 26, 27, and friction plate 28 are disposed, and cone spring 30 and stopper 31 are attached to these friction members.

The friction plate 25, friction washer 26 and cone spring 30 are disposed between the annular plate 21 and piston 11. The cone spring 30 has its outer circumference seated on the annular main body of the piston 11, and has the inner circumference pressed to the friction plate 25. The friction washer 26 is positioned between the friction plate 25 and annular plate 21. The friction washer 27, friction plate 28, and stopper 31 are located opposite to the friction plate 25 and others acros the annular plate 21. The friction washer 27 is pressed to the annular plate 21. The friction plate 28 is seated on the back of the friction washer 27, and its inner circumference is engaged with the stopper 31. The stopper 31 is made of, for example, snap ring, and is engaged with the annular groove provided on the outer circumferential surface of the tubular part 20. The stopper 31 prevents the friction washer 27 from moving to the flange 17 side. The friction plates 25, 28 possess projections 32 at, for example, four positions on the inner circumference, and the outer circumference of the tubular part 20 has axial grooves 33 to be engaged with those projections 32. As a result, the friction plates 25, 28 are linked to the tubular part 20 in a state free to move in the axial direction and not rotatable relatively.

The annular plate 21 is projected outward in the radial direction from the friction members. On the outer circumferential part of the annular plate 21, there are two notches 35 opposing, for example, in the direction of diameter. Of the plural pins 16, the pin 16 adjacent to the notch 35 has an extension part projecting to the piston 11 side, and this extension part is engaged with the notch 35. Hence, the annular plate 21 is linked with the pin 16 in a state free to move in the axial direction and not rotatable relatively.

In this constitution, while the lining 15 of the piston 11 is pressed to the front cover 2, the piston 11 and driven plate 12 relatively deflect along with the expansion and contraction of the damper spring 13. In this deflecting action, the annular plate 21 rotates on the piston 11 together with the driven plate 12. On the other hand, the friction plates 25, 28 are linked to the tubular part 20 of the piston 11 in a manner not rotatable relatively. Therefore, friction occurs on the surface of the friction washers 26, 27, and consequently a hysteresis torque occurs in the deflection characteristic of the lockup clutch 10.

Thus, according to this invention, since the friction mechanism (21, 25 to 28, etc.) exclusive for friction action of the lockup clutch 10 disposed by the torque converter is provided, the hysteresis torque in the deflection characteristic can be accurately set, so that the torque vibration absorption characteristics may be enhanced.

Other embodiment is described below while referring to FIGS. 2 and 3.

Figure 2:
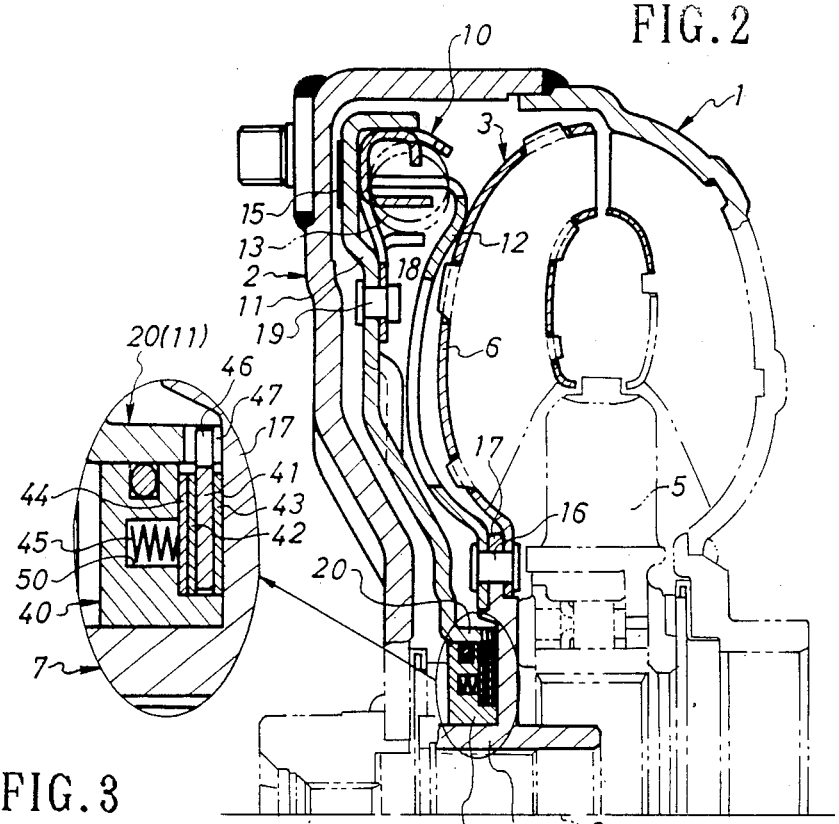
FIG. 2 is a partial sectional view of other emboidment of the invention.

In FIG. 2, the tubular part 20 is integrally formed on the inner circumference of the piston 11. The tubular part 20 is extending in the axial direction from the annular main body of the piston 11 toward the inside in the radial direction of the driven plate 12. The inner circumference of the tubular part 20 is apart in the radial direction from the outer circumference of the hub 7, and the annular member 40 is disposed between the two. At a position adjacent to the flange, 17, plural annular friction members are disposed between the tubular extension part provided on the inner circumference of the annular member 40 and the tubular part 20.

The annular member 40 is slidably fitted to the inner circumference of the tubular part 20 and the outer circumference of the hub 7 in tight contact state. As the friction members, in the shown structure, the annular plate 41, friction washers 42, 43 disposed at its both sides, and friction plate 44 located between the friction washer 42 and annular member 40 are provided. These friction members are thrust by springs 45, and are press-fitted with each other in the axial direction, and the friction washer 43 is also pressed to the flange 17. Of these friction members, the friction washers 42, 43 and friction plate 44 are rotatable with respect to the tubular part 20 and hub 7. By contrast, the annular plate 41 has protrusions 46 integrally formed, for example, at four positions on the outer circumference as shown in FIG. 3, and these projections 46 are slidably fitted to axial slots 47 provided in the tubular part 20, so that the annular plate 41 is linked to the tubular part 20 in a state not rotatable and free to move in the axial direction.

The springs 45 are disposed in a holes 50 formed in the annular member 40. The hole 50 has a bottom, and is opened to the end face of the friction plate 44 side of the annular member 40. By abolishing springs 45 or holes 50, for example, an annular cone spring may be disposed in tight contact between the friction washer 43 and flange 17.

Furthermore, the annular member 40 has plural holes 51 penetrating in the axial direction from the end face to the other end face, approximately on the same circumference as the above holes 50 and in alternate configuration. These holes 51 are for passing the coupling bolts 52, and, although not shown, the opening at the opposite side of the friction plate 44 is widened so as to accommodate the head of the bolt 52. The bolt 52 is screwed into the threaded hole 57 of the flange 17 by way of holes 55, 56 disposed in the friction members 41 to 44. That is, the bolt 52 composes a fixing mechanism for fixing the annular member 40 in a state being spaced from the flange 17 in the axial direction. Of the holes 55, 56, the hole 56 formed in the annular plate 41 is a slot longer in the circumferential direction, which permits the rotation of the annular plate 41.

According to this construction, when the lining 15 of the piston 11 is being pressed to the front cover 2, the piston 11 and driven plate 12 deflect relatively along with the expansion and contraction of the damper spring 13. In this deflecting action, the annular plate 41 turn together with piston 11. On the other hand, the friction washers 42, 43 and friction plate 44 are linked to the flange 17, together with the annular member 50 by means of bolts 52 in a manner not rotatable relatively. Therefore, friction occurs on the surface of the friction washers 42, 43, which results in generation of hysteresis torque in the deflecting characteristic of the lockup clutch 10.

Figure 3:
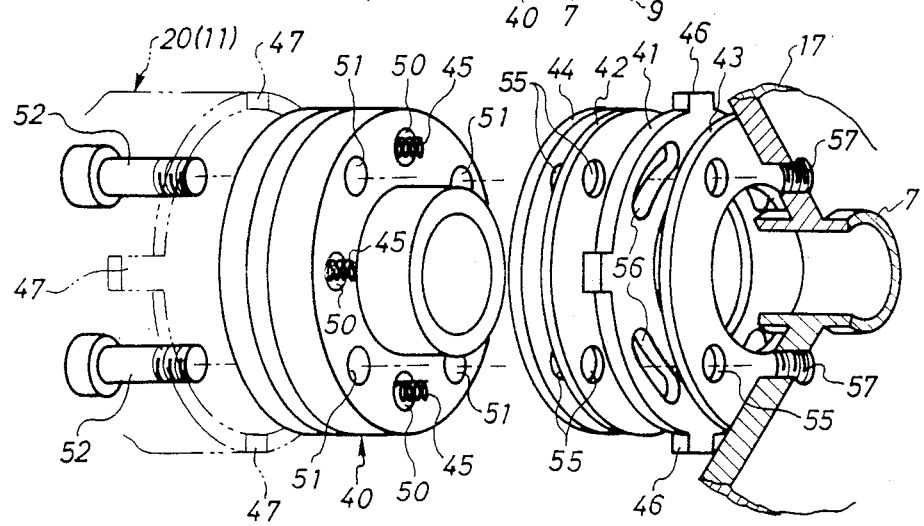
FIG. 3 is a perspective exploded view of a friction mechanism in FIG. 2.

In the embodiment shown in FIGS. 2 and 3, too, the same effects as in the embodiment in FIG. 1 can be obtained. Furthermore, in the structure of FIGS. 2 and 3, since a friction mechanism is provided between the inner circumference of the piston 11 and the outer circumference of the hub 7, the structure of the entire clutch is not increased in the axial direction.

What is claimed is:

1. A friction device of a lockup clutch comprising an annular plate-shaped piston pressure connected to an input portion of a torque converter, an annular driven plate coupled to a turbine of said torque converter, and damper springs for coupling said piston and said driven plate in a circumferential direction, in which a friction mechanism is disposed between an inner circumferential portion of said piston and a hub flange of said turbine, and said friction mechanism has a first friction member not rotatable relative to said turbine hub and a second friction member not rotatable relative to said piston, said first and second friction members being pressed into engagement with each other for producing friction between said friction members by relative rotation between said piston and said turbine hub.

2. A friction device of a lockup clutch according to claim 1, wherein said first friction member is an annular plate, and the outer circumferential part of said annular plate is slidably fitted to said driven plate through a coupling part so as to be not rotatable but free to slide in an axial direction relative to the turbine.

3. A friction device of a lockup clutch according to claim 2, wherein said piston has a tubular part projecting in an axial direction from an inner circumference of its annular main body toward said hub flange, and said tubular part is rotatably fitted to an outer circumference of said hub of said turbine, an inner circumferential part of said turbine hub by pins extending in an axial direction, said pins having an extension part spaced outward in a radial direction of said tubular part, and a coupling part formed by said extension part, said extension part engaging with a notch in an outer circumference of said annular plate.

4. A friction device of a lockup clutch according to claim 2 or 3, wherein said second friction member is disposed at opposite sides of said first friction member, and said friction mechanism has a spring for thrusting said second friction member positioned at one side of said first friction member to said first friction member side, and a stopper for supporting said second friction member positioned at the other side of said first friction member in an axial direction from an opposite side of said frist friction member.

5. A friction device of a lockup clutch according to claim 1, wherein an annular member is provided in a radial direction inside an inner circumference of said piston opposite to an outward flange of the turbine hub and in an axial direction, said annular member being affixed to said flange by fixing mechanism, and said friction mechanism is installed between said annular member and said flange, and a second annular friction member nonrotatably linked to the inner circumference of said piston.

6. A friction device of a lockup clutch according to claim 5, wherein said piston has a tubular part projecting in an axial direction from an inner circumference of an annular main body toward the upper flange side, and an annular member and friction mechanism are disposed between a tubular part and said turbine hub at an inner side of said tubular part and in a radial direction.

7. A friction device of a lockup clutch according to claim 6, wherein the friction device includes a linkage mechanism having a bolt extending in an axial direction for mutually fixing said annular member and said flange, said first friction member has a hole through which said bolt passes in almost contact state, and said second friction member includes a slot longer in the circumferential direction than said hole in said friction member for said bolt.

8. A friction device of a lockup clutch according to claim 6 or 7, wherein said friction mechanism includes a spring in a recess of said annular member for thrusting said friction member to said flange side.

9. A friction device of a lockup clutch according to claim 6 or 7, wherein said friction mechanism includes a cone spring for thrusting said friction member in an axial direction.

* * * * *